US009187250B2

(12) United States Patent
Westergaard Andersen

(10) Patent No.: US 9,187,250 B2
(45) Date of Patent: Nov. 17, 2015

(54) MODULAR BELT LINK

(75) Inventor: Kenneth Westergaard Andersen, Kolding (DK)

(73) Assignee: Ammeraal Beltech Modular A/S, Vejle (DK)

( * ) Notice: Subject to any disclaimer, the term of this patent is extended or adjusted under 35 U.S.C. 154(b) by 0 days.

(21) Appl. No.: 14/130,732

(22) PCT Filed: Jul. 4, 2012

(86) PCT No.: PCT/DK2012/050252
§ 371 (c)(1),
(2), (4) Date: Mar. 31, 2014

(87) PCT Pub. No.: WO2013/004247
PCT Pub. Date: Jan. 10, 2013

(65) Prior Publication Data
US 2015/0034460 A1 Feb. 5, 2015

(30) Foreign Application Priority Data

Jul. 6, 2011 (DK) .................................. 2011 70364

(51) Int. Cl.
*B65G 17/06* (2006.01)
*B65G 15/30* (2006.01)
*B65G 17/08* (2006.01)

(52) U.S. Cl.
CPC ................ *B65G 15/30* (2013.01); *B65G 17/08* (2013.01)

(58) Field of Classification Search
CPC ............................ B65G 17/062; B65G 17/061
USPC ....................... 198/844.1, 850, 851, 852, 853
See application file for complete search history.

(56) References Cited

U.S. PATENT DOCUMENTS 4,754,872 A * 7/1988 Damkjaer ...................... 198/852
4,953,693 A * 9/1990 Draebel ........................ 198/853
(Continued)

FOREIGN PATENT DOCUMENTS

DE            39 13 077 A1    11/1989
DE      20 2004 002998 U1     8/2004
(Continued)

OTHER PUBLICATIONS

International Preliminary Report on Patentability for International (PCT) Patent Application No. PCT/DK2012/050252 mailed Jan. 16, 2014, 6 pages.
(Continued)

*Primary Examiner* — Douglas Hess
(74) *Attorney, Agent, or Firm* — Sheridan Ross P.C.

(57) ABSTRACT

A modular belt link has leading and a trailing edges with a top surface located between the leading and trailing edges. A plurality of eye parts project from both the leading and trailing edges, and are spaced laterally and off set from one another such that eye parts on a trailing edge of one belt link may be inserted between eye parts on the leading edge of an adjacent belt link. Means are provided for mutually and hingedly connecting adjacent belt links such that the eye parts along the trailing and leading edge are united with substantially unbroken leading and trailing walls arranged perpendicular to the top surface. The walls are spaced from one another. Reinforcing ribs are arranged between the walls and an underside of the belt links. The reinforcement ribs extend at an oblique angle not parallel to the intended transport direction of the belt links.

8 Claims, 2 Drawing Sheets

(56) References Cited

U.S. PATENT DOCUMENTS

| | | | |
|---|---|---|---|
| 5,000,312 A | | 3/1991 | Damkjaer |
| 5,217,110 A | * | 6/1993 | Spangler et al. ............. 198/852 |
| 5,263,575 A | | 11/1993 | Ledet |
| 5,293,989 A | * | 3/1994 | Garbagnati ................... 198/853 |
| 5,305,869 A | | 4/1994 | Damkjaer |
| 5,339,946 A | * | 8/1994 | Faulkner et al. ............. 198/494 |
| 5,379,883 A | * | 1/1995 | Damkjaer .................... 198/853 |
| 6,216,854 B1 | * | 4/2001 | Damkjær et al. ............. 198/853 |
| 6,308,825 B1 | * | 10/2001 | Nakamura .................... 198/853 |
| 6,581,758 B1 | * | 6/2003 | van-Zijderveld et al. ..... 198/853 |
| 6,695,128 B2 | * | 2/2004 | Palmaer et al. ............. 198/778 |
| 6,814,223 B1 | * | 11/2004 | Verdigets et al. ......... 198/844.1 |
| 7,073,662 B2 | * | 7/2006 | Neely et al. .................. 198/850 |
| 7,377,380 B2 | * | 5/2008 | Menke et al. ................ 198/851 |
| 7,690,501 B2 | * | 4/2010 | Menke et al. ................ 198/851 |
| 8,720,676 B2 | * | 5/2014 | Neely et al. .................. 198/853 |
| 8,757,366 B2 | * | 6/2014 | MacLachlan ................ 198/853 |

FOREIGN PATENT DOCUMENTS

| | | |
|---|---|---|
| EP | 0567337 | 10/1993 |
| EP | 1655242 | 7/2007 |
| EP | 2113475 A1 | 11/2009 |

OTHER PUBLICATIONS

International Search Report prepared by the European Patent Office on Sep. 20, 2012, for International Application No. PCT/DK2012/050252.

Written Opinion prepared by the European Patent Office on Sep. 20, 2012, for International Application No. PCT/DK2012/050252.

Search Report prepared by the Danish Patent and Trademark Office on Mar. 14, 2012, for Application No. PA 2011 70364.

\* cited by examiner

MODULAR BELT LINK

CROSS REFERENCE TO RELATED APPLICATIONS

This application is a national stage application under 35 U.S.C. 371 and claims the benefit of PCT Application No. PCT/DK2012/050252 having an international filing date of Jul. 4, 2012, which designated the United States, which PCT application claimed the benefit of Danish Application No. PA 2011 70364 filed Jul. 6, 2011, the disclosure of each of which are incorporated herein by reference.

FIELD OF THE INVENTION

The present invention relates to a belt link as well as a modular conveyor belt built from the novel and inventive belt link.

BACKGROUND OF THE INVENTION

In the art this particular type of belt link has widespread use due to its unique strength and reliability characteristics. Especially within the manufacturing industry it finds widespread use.

These types of belt link modules are usually one inch long in the travelling direction and provided with a number of eye parts along leading and trailing edges such that a relatively large number of hinge connections are provided. Furthermore, the belt modules typically have a construction height of 8-12 mm.

Examples of the particular belt module to which the present invention is directed are sold under the brand name "QNB" by Ammeraal Beltech Modular A/S and an alternative product under the trade name "series 900 flat top" from the Intralox Corporation.

One problem with these known modular belt links is that they require a relatively large amount of material in order to provide the strength and the rigidity needed for the applications to which they are designed such that each individual modular belt link becomes relatively expensive. Also during the manufacturing process the machine time per module is relatively high due to the injection moulding process (first injecting the hot fluid plastics, and waiting for it to cool before a new cycle can be repeated) thereby increasing the manufacturing cost.

EP 0 567 337 disclose a modular belt link having eye parts arranged along opposite edges and a solid top surface between the edges. On the underside a number of reinforcing walls parallel to the travelling direction of the conveyor belt are arranged in clusters connecting two respectively three eye parts on opposite edges of the module.

OBJECT OF THE INVENTION

It is therefore an object of the present invention to increase the strength and rigidity of the modular belt links and at the same time reduce the amount of material used in the belt link which also improves the machine cycle time thereby decreasing the cost of manufacture.

DESCRIPTION OF THE INVENTION

The invention addresses this by a modular belt link having a leading and a trailing edge, where a top surface is provided between said leading and trailing edge, where a plurality of eye parts project from both the leading and trailing edges, where the eye parts are spaced laterally, and off set such that eye parts on a trailing edge of one element may be inserted between eye parts on the leading edge of an adjacent belt link, and that means are provided for mutually and hingedly connecting adjacent belt links, where the eye parts along the trailing and leading edge are united with substantially unbroken leading and trailing walls, arranged perpendicular to the top surface, where said walls are spaced, and that reinforcing ribs are arranged between said walls and the underside of the top surface, where said reinforcement ribs are arranged at an oblique angle not parallel to the intended transport direction of the belt links.

Particularly the provision of leading and trailing walls to which the eye parts are connected provides for improved distribution of the forces in the finished modular conveyor belt in that the connection means, especially when the connection means is a pin as described below, will distribute the force to and through the modular belt link in a more homogenous manner thereby utilizing the materials better. Furthermore, the reinforcing ribs arranged at an oblique angle will further increase the rigidity such that in combination with the leading and trailing walls a very strong and stiff structure is achieved. Also the force distribution in the module is optimised. Loads are transferred from module to module by means of the hinge pin interlocking/hingedly connecting adjacent belt modules. If for one reason or the other there is a concentration of tension/force on a few eye parts, the obliquely arranged walls will transfer the for/tension to other parts of the adjacent belt modules, and thereby distribute the force and lower the overall impact on the conveyor belt.

In a further advantageous embodiment of the invention the reinforcement ribs are arranged in clusters, comprising two to eight ribs, where each cluster is delimited by cluster sidewalls arranged between the leading and trailing walls, where said cluster side walls are parallel to the intended travelling direction.

To further arrange the reinforcement ribs in clusters limited by cluster sidewalls and the leading and trailing edges an increased rigid structure is created such that the modular belt link has increased strength properties. At the same time the cluster sidewalls in combination with the reinforcement ribs arranged at oblique angles together with the leading and trailing walls all integrally moulded with the top surface provides a very stiff modular belt link which is extremely resistant to lateral influences and sideways movement which could arise from handling of goods being transported or handled on the conveyor and as such the overall life expectancy of the conveyor belt is greatly improved.

In a still further advantageous embodiment of the invention adjacent cluster side walls, the underside of the top surface and the leading and trailing walls delimit a cavity, which cavity in size at least corresponds to the size of a tooth on a driving sprocket wheel.

The cavity serves to accommodate a tooth from the sprocket wheel which is used to propel the conveyor belt, i.e. transfer force from the driving mechanism to the conveyor belt in order to create the conveying motion.

By providing a cavity surrounded on all sides by rigid members of the belt link it is possible to transfer even more force to the modular belt link and thereby to the conveyor structure as such whereby the capacity of the conveyor belt is greatly increased.

In a still further advantageous embodiment of the invention the means provided with the eye parts for mutually and hingedly connecting adjacent belt links is either:

apertures provided laterally in each eye part, such that apertures of eye parts of adjacent belt links may be superposed and connected by means of a connection rod inserted laterally through the superposed apertures, or protrusions arranged on the eye parts along one edge, where said protrusions extend a distance laterally from the eye part, and where corresponding receiving means are provided on the eye parts of the opposite edge, such that the protrusions may be hingedly received in the receiving means, thereby connecting two adjacent belt links.

These means are quite well-known in that the apertures in the eye parts have been used for a number of different applications and in the prior art belt links mentioned above and the further connection means by using protrusions with corresponding receiving means is patented in the same applicant's earlier European patent EP1655242 B1. Naturally, the same advantages derived from the prior use of the types of interconnecting adjacent belt links are achieved when the technology is applied to the novel and inventive belt link according to the present invention.

In a still further advantageous embodiment the lateral free distance between adjacent eye parts on the leading and trailing edges is larger than the lateral width of the eye parts, where at least one eye part along the leading edge and the trailing edge is provided with a cam section on both sides of the eye part, such that the lateral width of the eye part with the cams is slightly less than the lateral free distance between adjacent eye parts, and where the cam at least is arranged flush with and extending from the top surface.

One of the main objects of the present invention is to utilize the material characteristics as best as possible such that a minimum amount of material is used in order to provide a strong and rigid modular belt link. However, the eye parts are exposed to very high loads, and at the same time it is desirable to have a substantially unbroken top surface for a number of applications such that debris or parts of the product do not become entangled with the conveyor belt itself. For these purposes it is advantageous to provide a cam where the cam is present on the surface such that the surface will have a substantially closed or continuous appearance. In this connection the formulation that the cam the cam at least is arranged flush with and extending from the top surface, shall be understood as the cam portions is in the same plane as the surface. At the same time the cam will reinforce the eye part such that substantial forces may be transferred by the connection pin or the protrusions from one conveyor belt link to another conveyor belt link.

In a still further advantageous embodiment of the invention the modular belt links are injection moulded.

Although this is a common method of manufacturing modular belt links the design incorporating the novel features as described above of the present inventive belt links provides special advantages when the belt links are injection moulded. Tests indicate that the machine time used for the manufacture of the new inventive belt links incorporating the obliquely arranged reinforcement ribs which together with the walls facilitate relatively thin material thicknesses, which results in the overall production time may be reduced from 23 minutes per m2, which is common machine time for the prior art belt modules mentioned in the introductory part with reference to the Intralox and the Ammeraal Beltech modules, down to only 4 minutes per m2 for the present invention. This is a substantial time saving which also in terms of money is very interesting in that the machine time and thus the manufacturing cost is dramatically reduced.

Furthermore, as the material thickness is reduced it is much easier to create a homogenous and fast filling of the moulds used for injection moulding the products, and as such, also a better quality with less discarded units is achieved.

In a still further advantageous embodiment of the invention the material thickness of the eye parts, side walls, the leading and trailing edges, the top surface, and the reinforcement ribs is the same, preferably between 0.5 and 2 mm, more preferred between 1 and 1.5 mm.

The advantages achieved with these features are already explained above.

The invention is also directed at a modular conveyor belt assembled from a plurality of modular belt links as described above. The inventive modular conveyor belt may be driven, i.e. there may be one or two motors attached in driving relationship with the axles around which the modular conveyor belt is arranged, or the conveyor belt may be undriven, meaning that for example gravity will influence objects placed on a belt in such a manner that the belt will rotate by the influence of gravity.

DESCRIPTION OF THE DRAWING

The invention will now be described with reference to the accompanying drawings wherein.

DETAILED DESCRIPTION OF THE INVENTION

Figure 1:
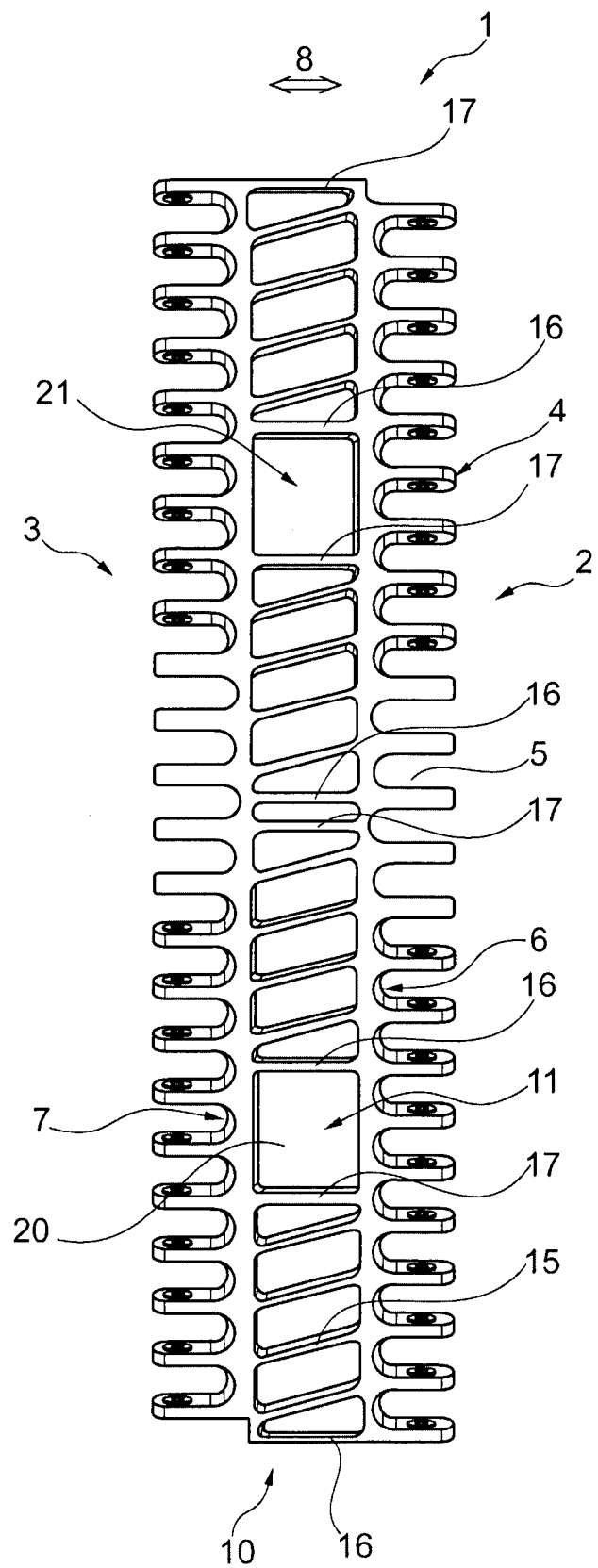
FIG. 1 illustrates the underside of a modular belt link

In FIG. 1 is illustrated the underside of a modular belt link 1 according to the invention. The belt link 1 comprises a leading edge 2 and a trailing edge 3. Along both edges 2, 3 are provided a plurality of eye parts 4 which eye parts along the trailing edge are off set relative to the eye parts 4 along the leading edge 2 such that when identical belt links 1 are pushed together, the eye parts 4 of one link will fit in the opening 5 between adjacent eye parts such that it is possible to connect adjacent belt links 1, for example by inserting a connecting pin (not illustrated) laterally through apertures provided in the eye parts 4.

Substantially unbroken leading wall and trailing walls 6, 7 are provided adjacent the eye part's 4 connection to the central part 10 of the belt link 1. The eye parts 4 are integral with the leading and trailing walls 6, 7 respectively such that the underside 11 of the modular belt link 1 together with the leading and trailing walls 6, 7 form a substantially rigid box-shaped member. Furthermore, between the leading and trailing walls 6, 7 are arranged reinforcement ribs 15. The reinforcement ribs 15 are arranged at an oblique angle relative to the intended transport direction indicated by the arrow 8. Furthermore, the reinforcement ribs 15 are arranged in clusters where in this particular embodiment four clusters are present, where each cluster is delimited laterally, i.e. perpendicular to pendicular to the transport direction indicated by the arrow 8 by sidewalls 16, 17. In this embodiment each cluster comprises four reinforcement ribs 15 which are arranged in an oblique angle relative to the transport direction 8.

The sidewalls 16, 17 in combination with the leading and trailing walls 6, 7 and the underside 11 of the modular belt link 1 provide a very stiff and rigid construction such that the material thickness of the walls, ribs etc. may be kept very low such that the overall weight of the modular belt link is approximately 40% in comparison to the regular prior art belt links. In the same instance, however, due to the inventive construction of the obliquely arranged reinforcement ribs and the sidewalls 16, 17 and the leading and trailing walls 6, 7 the belt link's body 10 is rigid and extremely strong. The limitation on power transferred from one belt link to the adjacent belt link and thereby the conveyor's ability to carry goods is limited to the strength of the eye parts 4 in combination with the connection means hingedly connecting to adjacent belt links. These aspects will be discussed further below.

Returning to FIG. 1 and the illustration of the underside two "empty" sections 20, 21 are provided. These sections 20, 21 are delimited by sidewalls 16, 17, leading and trailing walls 6, 7 and the underside 11 of the belt link's product caring surface. The sections 20, 21 are provided in order for the teeth on a sprocket wheel to engage the belt link 1 in order to propel the conveyor forwards. Typically, endless conveyor belts of this type are arranged about two axles spaced the length of the conveyor belt where at least one axle typically is motor-driven in order to rotate the conveyor belt.

Figure 2:
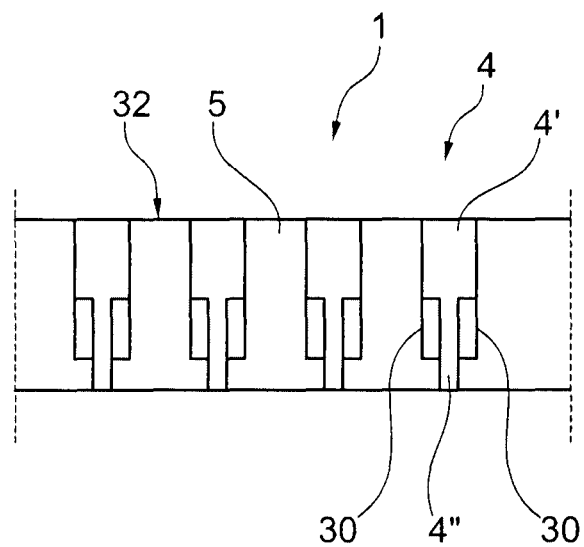
FIG. 2 illustrates a section of a front view of a modular belt link
Figure 3:
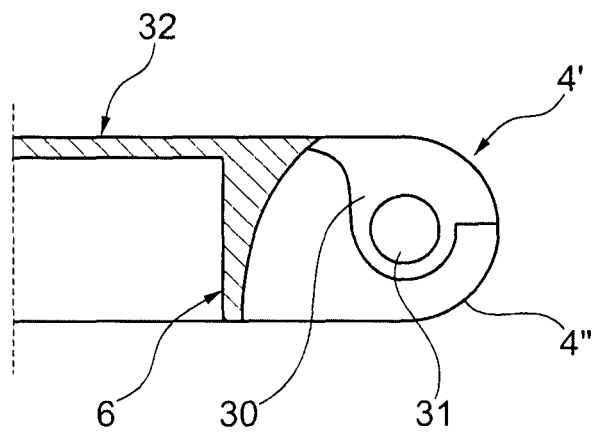
FIG. 3 illustrates a cross section through a section of a belt link

Turning to FIG. 2 a section of a front view of a modular belt link 1 according to the invention is illustrated. The belt link 1 has a number of eye parts 4 where the eye parts 4 are spaced such that an opening 5 is provided between each eye part 4. By assembling identical modular belt links the eye parts of an adjacent belt link will interfit in the opening 5 between two eye parts 4 substantially without any opening between adjacent eye parts. In order to save material and also provide strength the eye part has a varying dimension seen from the top to the bottom. The uppermost part 4' of the eye part is relatively thick where the thickness is created by providing a cam 30 extending the top surface 32 of the belt link partly over the eye part 4. The material thickness of the ribs, walls etc. is maintained in the eye part 4" such that the cams 30 provided on either side of the eye part 4, provide the eye part with increased strength. As is easily deductible from FIG. 3, the cam 30 surrounds the aperture 31 such that added strength is provided in the module 1 where it is most needed, i.e. where the forces from the conveyor belt is to be transferred to a connection pin (not illustrated) creating the tension force in the conveyor belt.

Although the embodiment explained above with reference to FIGS. 1, 2 and 3 refers to conveyor belt modules 1 being assembled by means of a connection pin inserted through superposed apertures 31, laterally with respect to the travelling direction 8, other means of hingedly connecting adjacent belt links 1 also falls within the scope of protection.

By being able to create a modular belt link where substantially all parts of the belt link have an equal material thickness, a more homogenous construction is achieved. Also due to the arrangement of the reinforcement ribs, the leading and trailing walls 6, 7 and the side walls 16, 17, a very stiff and rigid construction having a very high strength compared to the material used in order to manufacture the modular belt link is achieved. This provides added advantages for injection moulded products in that the cooling period of the thinner material thickness provides for a much faster production cycle such that as already explained above, normally the prior art modules would require approximately 23-24 minutes per m2 in injection moulding time, whereas the new inventive modular belt link having a increased strength using less material only requires approx. 4 minutes per m2. This in turn results in a substantial saving in machine time, production time, material use and then consequently in price.

The reinforcement cams around the eye parts provide sufficient material in order to transfer the forces to which the conveyor belts is exposed, such that enough strength is provided for very high loads.

Furthermore, providing the eye parts 4 with the wide top section 4' creating a substantially flush top surface 32 on the conveyor belts, provides for a substantially smooth surface which will not create marks, impressions or otherwise in goods transported on the conveyor.

The invention claimed is:

1. A modular belt link, having a leading and a trailing edge, where the leading and trailing edges are substantially parallel to one another, where a top surface is provided between said leading and trailing edge, where a plurality of eye parts project from both the leading and trailing edges, where the eye parts are spaced laterally, and offset such that eye parts on a trailing edge of one element may be inserted between eye parts on the leading edge of an adjacent belt link, and that means are provided for mutually and hingedly connecting adjacent belt links, wherein the eye parts along the trailing and leading edge are united with substantially unbroken leading and trailing walls, said walls being parallel to the leading and trailing edges and arranged perpendicular to the top surface, where said walls are spaced, and that reinforcing ribs are arranged between said walls and the underside of the top surface, where said reinforcement ribs are arranged at an oblique angle not parallel to the intended transport direction of the belt links.

2. The modular belt link according to claim 1, wherein the reinforcement ribs are arranged in clusters, comprising two to eight ribs, where each cluster is delimited by cluster sidewalls arranged between the leading and trailing walls, where said cluster side walls are parallel to the intended travelling direction.

3. The modular belt link according to claim 2 wherein adjacent cluster sidewalls, the underside of the top surface and the leading and trailing walls delimit a cavity, which cavity in size at least corresponds to the size of a tooth on a driving sprocket wheel.

4. The modular belt link according to claim 1, wherein the means provided with the eye parts for mutually and hingely connecting adjacent belt links is either:
   apertures provided laterally in each eye part, such that apertures of eye parts of adjacent belt links may be superposed and connected by means of a connection rod inserted laterally through the superposed apertures, or
   protrusions arranged on the eye parts along one edge, where said protrusions extend a distance laterally from the eye part, and where corresponding receiving means are provided on the eye parts of the opposite edge, such that the protrusions may be hingely received in the receiving means, thereby connecting two adjacent belt links.

5. The modular belt link according to claim 1 wherein the lateral free distance between adjacent eye parts on the leading and trailing edges is larger than the lateral width of the eye parts, where at least one eye part along the leading edge and the trailing edge is provided with a cam section on both sides of the eye part, such that the lateral width of the eye part with the cams is slightly less than the lateral free distance between adjacent eye parts, and where the cam at least is arranged flush with and extending from the top surface.

6. The modular belt link according to claim 1 wherein the modular belt links are injection moulded.

7. The modular belt link according to claim 1 wherein the material thickness of the eye parts, side walls, the leading and trailing edges, the top surface, and the reinforcement ribs is the same, preferably between 0.5 and 2 mm, more preferred between 1 and 1.5 mm.

8. The modular conveyor belt assembled from a plurality of modular belt links according to claim 1, wherein the conveyor belt is arranged around at least two rotating axles, where optionally one or two of the axles may be driven.

* * * * *